(12) United States Patent
Maiorana

(10) Patent No.: US 10,589,799 B2
(45) Date of Patent: Mar. 17, 2020

(54) AERODYNAMIC DEVICE FOR A TANK TRAILER

(71) Applicant: MAC LTT, INC., Kent, OH (US)

(72) Inventor: James A. Maiorana, Hartville, OH (US)

(73) Assignee: Mac LTT, Inc., Alliance, OH (US)

( * ) Notice: Subject to any disclaimer, the term of this patent is extended or adjusted under 35 U.S.C. 154(b) by 227 days.

(21) Appl. No.: 15/623,051

(22) Filed: Jun. 14, 2017

(65) Prior Publication Data

US 2018/0362100 A1    Dec. 20, 2018

(51) Int. Cl.
*B62D 35/02*    (2006.01)
*B62D 35/00*    (2006.01)
*B60P 3/22*    (2006.01)

(52) U.S. Cl.
CPC .......... *B62D 35/001* (2013.01); *B62D 35/02* (2013.01); *B60P 3/224* (2013.01)

(58) Field of Classification Search
CPC .... B62D 35/001; B62D 35/008; B62D 35/02; B62D 37/02; B60P 3/22
USPC .......... 296/180.1, 180.4, 198; 280/837, 839, 280/768, 847, 851
See application file for complete search history.

(56) References Cited

U.S. PATENT DOCUMENTS

| | | | |
|---|---|---|---|
| 3,000,340 A | 9/1961 | Rackel | |
| 3,612,555 A | 10/1971 | Baker | |
| 4,640,541 A * | 2/1987 | FitzGerald | B62D 35/001 280/851 |
| D292,785 S | 11/1987 | Warren | |
| 5,280,990 A * | 1/1994 | Rinard | B62D 35/001 296/180.1 |
| D354,726 S | 1/1995 | Fitzgerald et al. | |
| D510,057 S | 9/2005 | Van Buuren | |
| D542,716 S | 5/2007 | Warren | |
| 7,748,772 B2 | 7/2010 | Boivin et al. | |
| D649,090 S | 11/2011 | Boivin et al. | |
| 8,191,956 B1 * | 6/2012 | Dixon, Jr. | B62D 35/001 296/180.4 |
| 8,226,158 B1 * | 7/2012 | Jackson | B62D 25/168 280/160 |
| D668,582 S | 10/2012 | Doron | |
| 8,845,008 B1 | 9/2014 | Maiorana et al. | |
| 9,656,699 B1 | 5/2017 | Polgrean | |
| 9,919,750 B2 | 3/2018 | Baker et al. | |
| 2005/0161976 A1 | 7/2005 | Ortega et al. | |
| 2008/0303309 A1 | 12/2008 | Dayton | |
| 2008/0303311 A1 | 12/2008 | Roush | |
| 2009/0189414 A1 | 7/2009 | Boivin et al. | |
| 2011/0148142 A1 | 6/2011 | Kint | |

(Continued)

*Primary Examiner* — Dennis H Pedder
(74) *Attorney, Agent, or Firm* — Sand, Sebolt & Wernow Co., LPA

(57) ABSTRACT

An aerodynamic device for a trailer is provided that includes an air fairing or skirt that smoothly transitions into a fender for the wheels of the trailer. The aerodynamic device may be a substantially unibody member that has a forward region, a transition region, and a rear region. The first region defines the aerodynamic skirt beneath the trailer and the second planar region defines the fender for wheels of the trailer such that the fairing smoothly transitions from the skirt beneath the trailer to the fender covering the wheels based the shape of the bend in the transition region.

12 Claims, 8 Drawing Sheets

(56) References Cited

U.S. PATENT DOCUMENTS

| | | | |
|---|---|---|---|
| 2011/0204677 A1* | 8/2011 | Wood | B62D 35/001 |
| | | | 296/180.1 |
| 2012/0091754 A1 | 4/2012 | Lee et al. | |
| 2013/0119701 A1 | 5/2013 | Dayton | |
| 2013/0181477 A1 | 7/2013 | Reiman et al. | |
| 2013/0328298 A1 | 12/2013 | Thomas et al. | |
| 2016/0096558 A1 | 4/2016 | Bassily et al. | |
| 2016/0121940 A1 | 5/2016 | Courtney et al. | |
| 2017/0008576 A1 | 1/2017 | Petersson | |
| 2017/0029044 A1 | 2/2017 | Senatro | |
| 2017/0217506 A1* | 8/2017 | Bezner | B62D 35/001 |
| 2018/0362100 A1 | 12/2018 | Maiorana | |

* cited by examiner

AERODYNAMIC DEVICE FOR A TANK TRAILER

BACKGROUND

Technical Field

The present disclosure relates generally to aerodynamic devices for use with trailers towed behind trucks. More particularly, the present disclosure relates to an air fairing and fender on a fluid tank trailer. Specifically, the present disclosure relates to an aerodynamic skirt beneath the trailer that smoothly transitions from the skirt beneath the trailer to the fender covering the wheels. The air fairing defining the skirt and fender may be one or more of the following: flexible, uniform, continuous, seamless, and uninterrupted.

Background Information

Trailers are pulled by road tractors/trucks. Typically these large devices are not very aerodynamic, and as such often create drag forces resulting in lessened gas mileage/fuel efficiency, amongst other things.

In an effort to increase efficiency, others have developed various aerodynamic skirts, air fairings, wind damns and the like. Ordinarily, the fairings include a planar segment extending beneath the trailer. Some trailer skirts for container trailers have been made flexible, as shown in U.S. Pat. No. 7,748,772. Furthermore, it is recognized that the shape of the skirts, and their respective positions on the road trailer, have a significant effect on the aerodynamic efficiency of the road trailer.

One example of an air fairing positioned beneath a platform box trailer is provided in U.S. Patent Application Publication No. 2017/0029044 (the '044 publication). The platform box trailer may also be referred to as a container trailer and the containing volume defined thereby is generally rectangular in cross section as shaped by the flat/planar wall of the trailer. The '044 publication indicates that its air fairing may include a front skirt fairing, a transition, and a rear skirt fairing. The transition may be angled slightly outward from the front skirt fairings but at no more than a twelve degree angle with respect to the center line of the cargo trailer. The angle of the transition provides clearance for the rear side skirt fairings to be located an additional three inches outward of the side of the forward side skirt fairings to accommodate trailer wheels on the back of the box trailer. As such, the linear path or a longitudinal plane along the length of the cargo trailer for rear side skirt fairings is located outwardly of the linear path or longitudinal plane of the forward side skirt fairings in order for it to clear the tires on the trailer wheels. The '044 publication indicates that Federal law allows the tires on the platform box trailer to exceed the outer base of the trailer envelope by three inches. As such, the '044 publication orients the transition of the rear side skirt fairings to allow the tires to reside within the three inch envelope to comply with Federal regulations. The front skirt fairing, the transition, and the rear skirt fairing of the '044 publication are fabricated from components constructing them in an interconnected manner. As such, each component is individually fabricated and then assembled to build the entire structure. Thus, there are seams between fairing segments and the entire design is not seamless, is not continuous, and not uniform.

Some trailers are referred to as tank trailers, which are different from the container trailer shown in U.S. Pat. No. 7,748,772 and the '044 publication. An exemplary tank trailer is shown in U.S. Pat. No. 8,845,008. Accordingly, since tank trailers are structurally different than the container trailer identified in U.S. Pat. No. 7,748,772 and the '044 publication, different structural requirements for air fairings, air deflectors, wind dams, or the like, are needed to reduce drag forces thereby increasing efficiency.

SUMMARY

Issues continue to exist with the inefficiencies experienced by tank trailers at least partly because of their shape (which is different from traditional container trailers). Because of tank trailer shape, some difficulties exist with fitting a proper trailer skirt/air fairing completely along the bottom of the trailer. Accordingly, a need continues to exist for an improved aerodynamic device for a tank trailer. More particularly, a need continues to exist for an air fairing for a tank trailer that includes a forward region, a transition region, and a rear region. However, the need also continues to exist for an air fairing that is fabricated from a seamless, uniform, continuous, and uninterrupted skirt to increase aerodynamic efficiency. Furthermore, a need continues to exist for an air fairing with a larger offset (i.e., greater than three inches) relative to the transition region between the first forward region and the rear second region of the fairing. The present disclosure addresses these and other issues.

In one aspect, one embodiment of the present disclosure may provide an aerodynamic fairing and fender combination for a trailer comprising: a forward end and a rear end defining a longitudinal direction therebetween; a top edge and a bottom edge defining a vertical direction therebetween; an outer surface opposite an inner surface defining a transverse direction therebetween wherein the inner surface faces towards a central longitudinal axis of the trailer and the outer surface faces outwardly away from the central longitudinal axis of the trailer; a first planar region extending rearwardly from the forward end; a transition region connected to the first planar region at a first bend, wherein the transition region extends rearwardly from the first bend and outwardly from the central longitudinal axis of the trailer; a second planar region connected to the transition region at a second bend and extending rearwardly therefrom; and wherein the first planar region defines an aerodynamic skirt beneath the trailer and the second planar region defines a fender for wheels of the trailer such that the fairing smoothly transitions from the skirt beneath the trailer to the fender covering the wheels.

In another aspect, an embodiment of the present disclosure may provide the aerodynamic fairing and fender combination that may include a first longitudinal plane coplanar with the first planar region; a second longitudinal plane coplanar with the second planar region; an offset distance of the first longitudinal plane from the second longitudinal plane in a range from 20 inches to 30 inches. In another embodiment the offset distance is about 25 inches. In another embodiment, the aerodynamic fairing and fender combination may provide that the skirt and fender that are collectively defined by the first planar region, the transition region, and the second planar region are integrally formed from a seamless uniform material; or may be continuous and uninterrupted; or may be formed from a flexible material so as to permit the bottom edge to flexibly bend inwardly when subjected to an external force. In another embodiment, the aerodynamic fairing and fender combination may include wherein the outer surface is concave at the first bend; or wherein the outer surface is convex at the second bend. In another embodiment, the aerodynamic fairing and fender combination may include wherein when viewed from above, the first planar region, the transition region, and the second planar region form an elongated generally S-shaped profile.

In another embodiment, the aerodynamic fairing and fender combination may include a vertically oriented leading edge defining the forward end, wherein the leading edge is positioned directly rearward and closely adjacent at least one leg of the landing gear on the trailer.

In another embodiment, the aerodynamic fairing and fender combination may include a first support strut positioned closely adjacent the inner surface of the skirt in the first planar region, the first support strut having an upper end and a lower end; wherein the upper end of the first support strut is generally vertically level with the top edge and wherein the lower end of the support strut is not vertically level the bottom edge. In another embodiment, the aerodynamic fairing and fender combination may include a second support strut positioned closely adjacent the inner surface of the fender in the second planar region, the second support strut having an upper end and a lower end; a generally transversely oriented outrigger having a transversely aligned length within a range from 20 inches to 30 inches; the outrigger having an inner end connected to a frame of the trailer and an outer end coupled to the second support strut.

In another embodiment, the aerodynamic fairing and fender combination may include a longitudinally aligned first length of the first planar region; a longitudinally aligned second length of the second planar region; a ratio of the first length to the second length in range from 2:1 to 1:1. In another embodiment, the aerodynamic fairing and fender combination may include wherein the ratio of the first length to the second length is about 13:8.

In another aspect, the present disclosure may provide an aerodynamic device for a trailer that includes an air fairing or skirt that smoothly transitions into a fender for the wheels of the trailer. The aerodynamic device may be a substantially unibody member that has a forward region, a transition region, and a rear region. The first region defines the aerodynamic skirt beneath the trailer and the second planar region defines the fender for wheels of the trailer such that the fairing smoothly transitions from the skirt beneath the trailer to the fender covering the wheels based the shape of the bend in the transition region.

In another aspect, an embodiment of the present disclosure may provide a system comprising: a fluid tank trailer towable by a truck, the tank trailer including a frame having arcuate supporting sections positioned below and supporting the tank trailer; a trolley having ground engaging wheels operatively connected to the frame adjacent a rear end of the tank trailer; an air fairing and fender combination formed from a skirt coupled to the frame beneath the tank trailer that smoothly transitions outwardly to form a fender covering the wheels. The system may further include support struts that connect to the frame and connect to the skirt below the trailer; at least one horizontally outrigger connected to the frame at an inner end and connected to the fender at an outer end, and having a support strut extending downward from the outrigger connection to the fender.

In another aspect, an embodiment of the present disclosure may provide a system comprising: a tank trailer towable by a truck, the tank trailer including a tank having an at least partially arcuate cross section to contain flowable material therein; at least one discharge outlet in operable communication with the tank to permit the flowable material to exit the tank therethrough; a trolley having ground engaging wheels operatively connected to the frame adjacent a rear end of the tank trailer; and an air fairing and fender combination formed from a skirt coupled to the frame beneath the tank that smoothly transitions outwardly to form a fender proximate the ground engaging wheels.

In yet another aspect, an embodiment of the present disclosure may provide a tank trailer towable by a truck comprising: a tank having an at least partially arcuate cross section to contain flowable material therein; at least one discharge outlet in operable communication with the tank to permit the flowable material to exit the tank therethrough; a trolley having ground engaging wheels operatively connected to the frame adjacent a rear end of the tank trailer; and an air fairing and fender combination formed from a skirt coupled to the frame beneath the tank that smoothly transitions outwardly to form a fender proximate the ground engaging wheels. This or another embodiment may include landing gear on the tank trailer positioned forwardly from the skirt. This or another embodiment may include a wind deflector extending forwardly from a connection with the landing gear. This or another embodiment may include support struts that connect to the frame and connect to the skirt below the trailer; and at least one transversely aligned outrigger connected to the frame at an inner end and connected to the fender at an outer end, and having a support strut extending downward from the outrigger connection to the fender.

BRIEF DESCRIPTION OF THE SEVERAL VIEWS OF THE DRAWINGS

Sample embodiments of the disclosure are set forth in the following description, are shown in the drawings and is particularly and distinctly pointed out and set forth in the appended claims.

Similar numbers refer to similar parts throughout the drawings.

DETAILED DESCRIPTION

Figure 1:
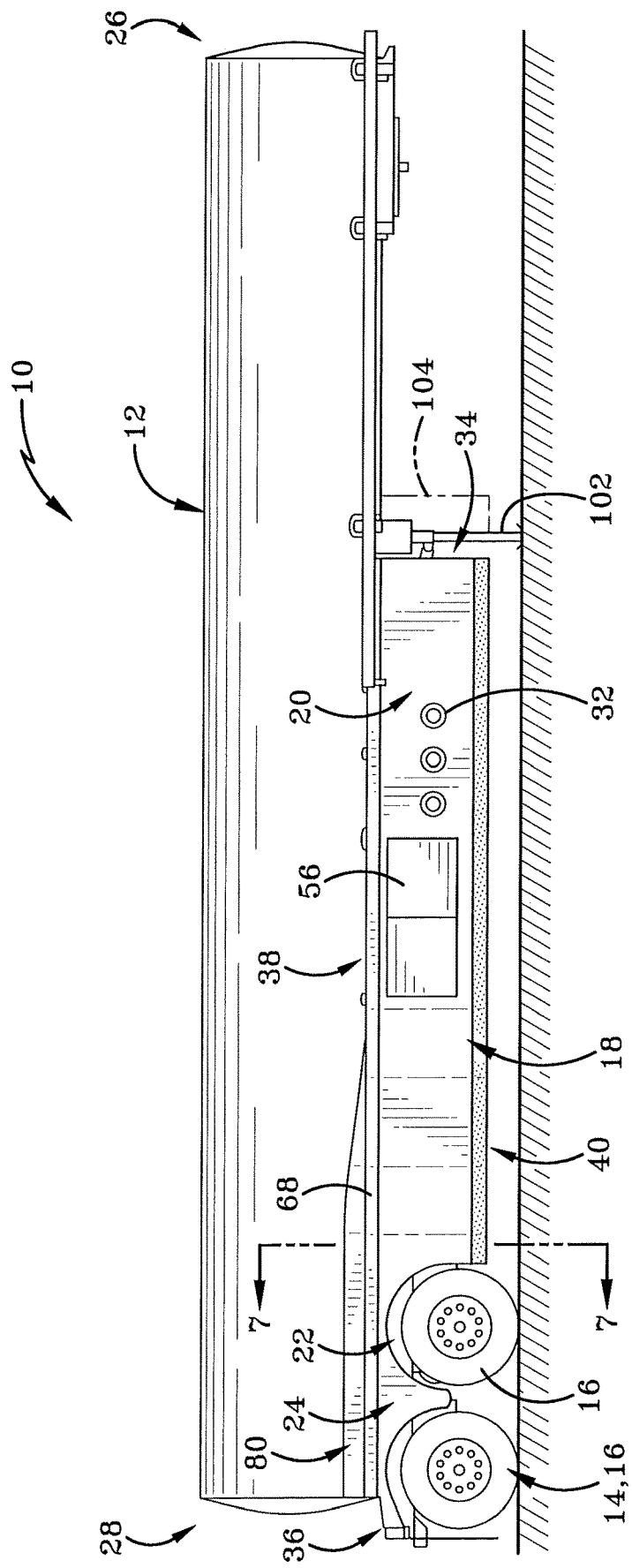
FIG. 1 is a side elevation view of a tank trailer having an aerodynamic fairing and fender combination mounted thereto.

A tank trailer that is towable by a road tractor/truck is depicted generally throughout the figures at 10. Tank trailer 10 includes a tank 12, a trolley 14 having ground engaging wheels 16, and an air fairing and fender combination 18 formed from a skirt 20 coupled to a frame 22 supporting the tank 12 and beneath the tank 12, such that the fairing and fender combination 18 smoothly transitions outwardly to form a fender 24 proximate the ground engaging wheels 16.

Tank 12 includes a forward end 26 and a rear end 28 defining a longitudinal direction therebetween. Tank 12 is at least partially arcuate in cross section configured to contain a flowable material therein (i.e., material that is able to flow). Tank 12 may be substantially rigid and may be formed from a primarily metal material, such as aluminum. The flowable material contained within the storage volume defined by tank 12 may be a fluid or solid bulk materials that can flow, such as various grains, like wheat, oats, rice, corn, barley, sorghum, rye, millet, or the like. The flowable material may be considered a bulk material that has rheological properties, such that when the flowable material may contain both solid and fluid characteristics.

A discharge outlet is in operable communication with the tank 12 to permit the flowable material to exit the tank 12 therethrough. The discharge outlet typically has a cross section area of the outlet opening that is significantly smaller than the cross sectional area of the tank 12. A diagrammatic view of a discharge outlet 32 depicts a pipe extending through skirt 20 of the fairing and fender combination 18. It is to be understood that the discharge outlet on tank 12 may be connected via pipeline and extend through various locations or not extend through the fairing and fender combination 18 as is depicted in other exemplary embodiments of the present disclosure.

Trolley 14 supports tank 12 via ground engaging wheels 16 in a conventionally known manner beneath and proximate the rear end 28 of tank 12. While not shown in the figures, an axle extends perpendicularly to a longitudinal axis 30 of tank 12 to define a transverse or axial direction between left and right wheels of the trolley 14. The trolley 14 may further include suspension and brake assemblies as one having ordinary skill in the art would understand. Furthermore, the trolley 14 may be rigidly connected to tank 12 with a substantially rigid supportive belly pad.

Figure 6:
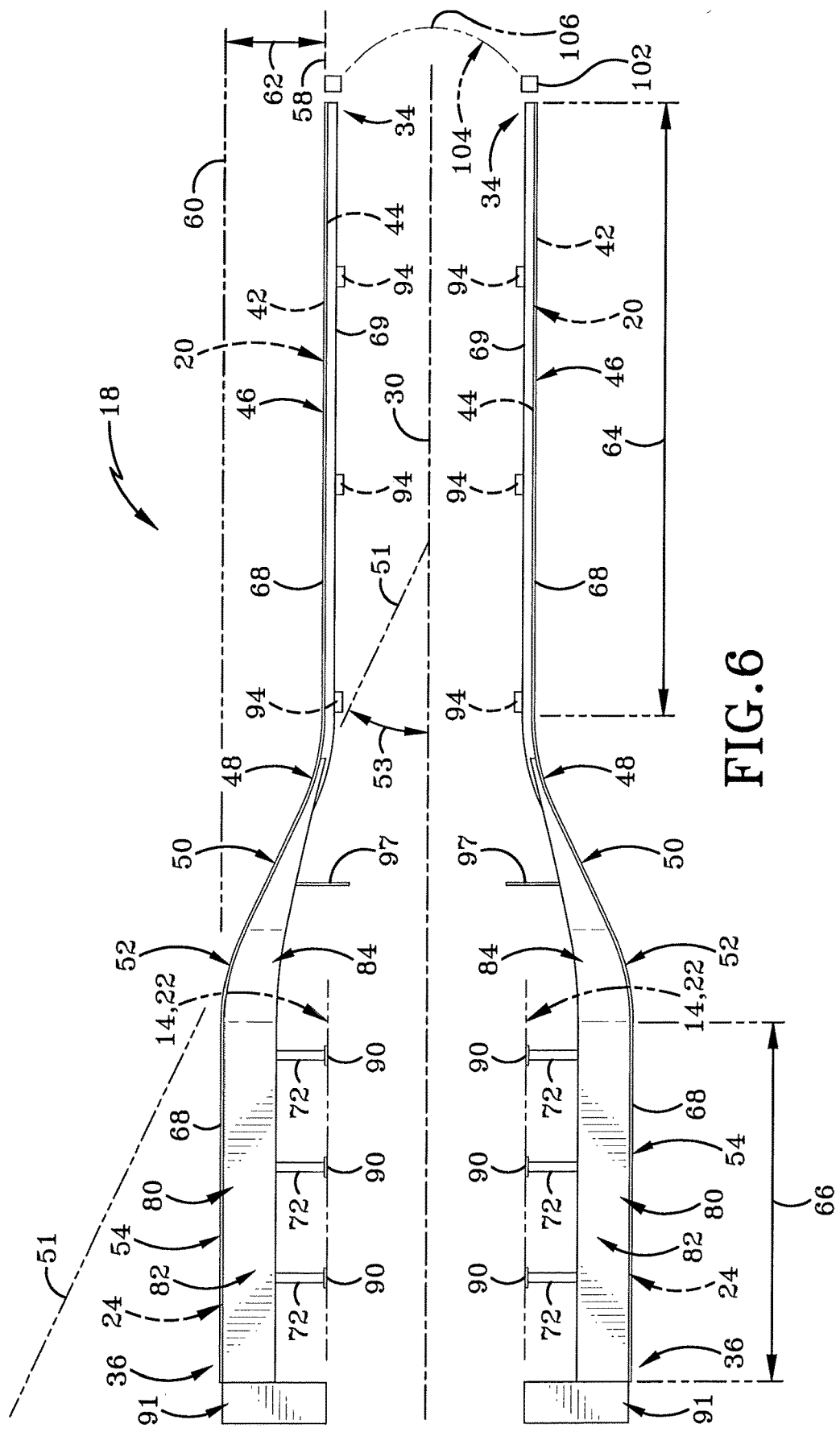
FIG. 6 is a top plan view of the aerodynamic fairing and fender combination device with some portions of the trailer not show for clarity.

It is to be understood that the fairing and fender combination 18 is formed from two equally mirrored skirt 20 and fender 24 assemblies on each respective left and right side of the trailer 10. As shown in FIG. 6, the left and right assemblies are mirrored about the longitudinal axis 30 of trailer 10. However, for brevity and in accordance with the present disclosure, it is to be understood that certain components of the fairing and fender combination 18 that are mirrored about the longitudinal axis 30 are not duplicated in this description.

Figure 2:
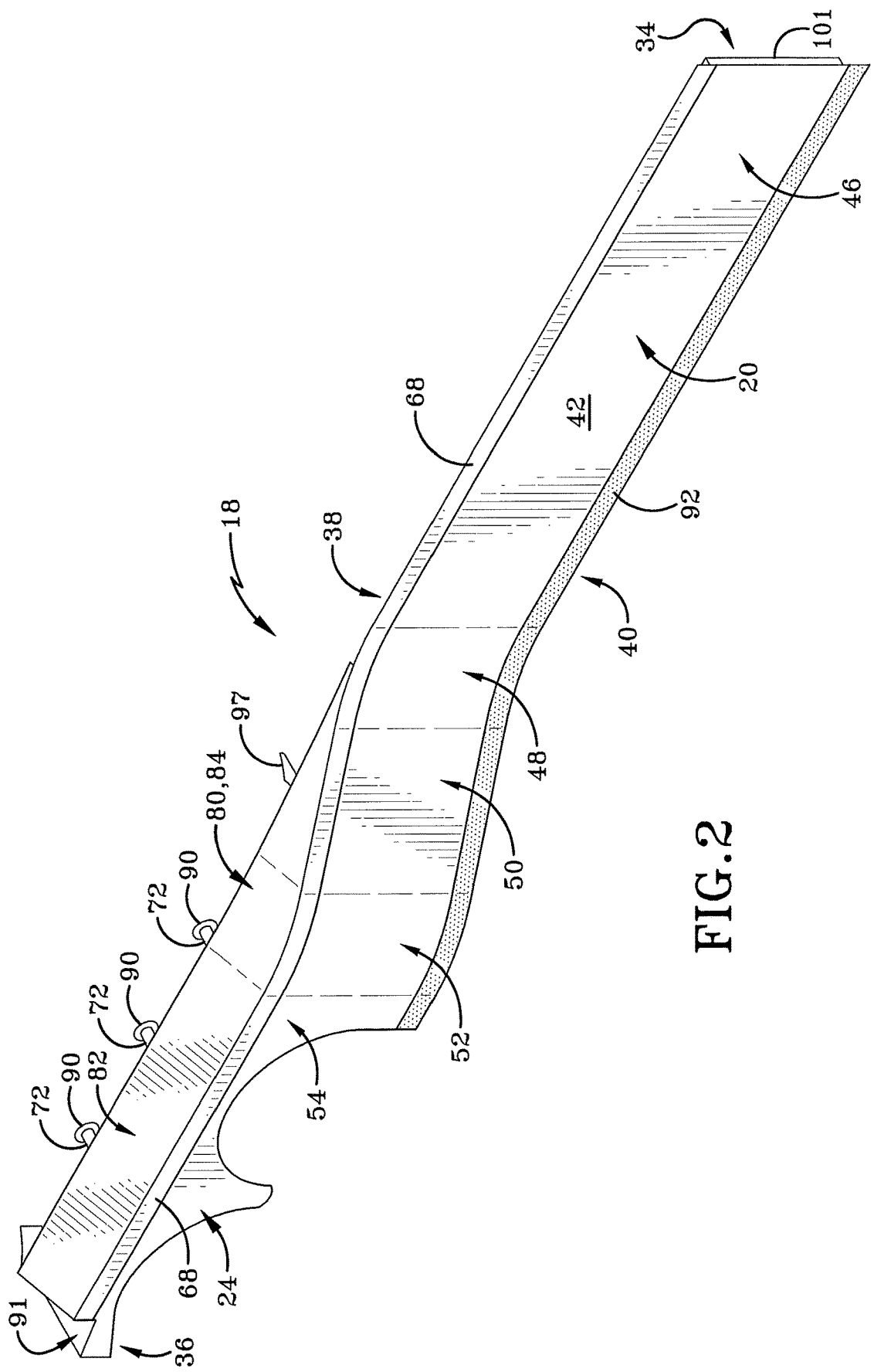
FIG. 2 is a top perspective view of one embodiment of the aerodynamic fairing and fender combination device in accordance with the present disclosure.

FIG. 2 depicts one of the fairing and fender combination 18 assemblies. As indicated previously, the skirt 20 transitions or bends outwardly in a smooth manner to define a fender 24 proximate the ground engaging wheels 16. More particularly, fairing and fender combination 18 for trailer 10 may include a forward end 34, a rear end 36, a top edge 38, a bottom edge 40, an outer surface 42 opposite an inner surface 44 (FIG. 5) wherein the inner surface 44 faces towards the central longitudinal axis 30 of trailer 10 and the outer surface 42 faces outwardly away from the central longitudinal axis 30 of trailer 10.

The fairing and fender combination 18 further includes a first forward planar region 46, a first bend 48, a transition region 50, a second bend 52, and a rear second planar region 54. The first planar region 46 is oriented forwardly from the first bend 48. The first forward planar region 46 extends rearwardly from the first end 34 towards first bend 48. The first bend 48 is between the first forward planar region 46 and the transition region 50. The outer surface 42 at the first bend 48 is concave such that the transition region 50 extends rearwardly from the first bend 48 and outwardly from the central longitudinal axis 30 of the trailer 10. In one exemplary embodiment, the outer surface 42 of the transition region may be substantially flat, however other embodiments may provide an outer surface 42 of the transition region 50 that is substantially arcuate. The transition region 50 is located between the first bend 48 and the second bend 52. Second bend 52 is located rearwardly from the transition region 50. The outer surface 42 of the second bend 52 is substantially convex. The rear second planar region 54 is positioned rearwardly from second bend 52 and extends towards second end 36. The rear second planar region 54 is substantially planar between the second end 36 and the location where the second bend 52 ends its convex curve and becomes flat. The fender 24 is substantially defined by the second rear planar region 54 and the skirt 20 is substantially defined by the forward first planar region 46.

In one exemplary embodiment, a single piece of continuous material forms the first planar region 46, the first bend 48, the transition region 50, the second bend 52, and the rear second planar region 54. Thus, it is described that the skirt 20 and the fender 24 are collectively defined as a single seamless uniform material. This enables a smooth and seamless transition from the skirt 20 to the fender 24. Stated otherwise, there is a seamless transition from the first planar region 46 across the first bend 48 along the transition region 50 across the second bend 52 to the second rear planar region 54. One exemplary and non-limiting material would be a flexible polymer or rubber-like material that can be substantially bent and held in place with a frame beneath the tank 12 of trailer 10. Furthermore, it may be possible to fabricate the and fairing and fender combination 18 from a metal material that has been rolled or bent into the shape described above. In another exemplary embodiment, the material that forms the skirt 20 and the fender 24 that is collectively defined by the first planar region 46, the transition region 50, and the second planar region 54 is continuous and/or uninterrupted. However, it is to be understood that other embodiments may include slight interruptions as depicted in FIG. 1 to permit various discharge ports and other storage bins 56 to extend therethrough.

As depicted in FIG. 2, the rear second planar region 54 may have an arcuate bottom edge that extends upwardly and is shaped to expose portions of ground engaging wheels 16. Although the rear edge may provide a cutout shape to extend over or around the ground engaging wheels 16, it is to be understood that the rear second planar region 54 is still substantially planar near the top edge thereof. Accordingly, it is understood that the fender 24 is still considered planar or flat. Alternatively, the cutout regions could be filled in such that the ground engaging wheels 16 are substantially covered by fender 24.

Another exemplary manner of describing the fairing and fender combination 18 is that it has a generally elongated S-shaped profile when viewed from above or below. The generally elongated S-shaped profile provides an offset between the first planar region 46 and the rear second planar region 54.

As depicted in FIG. 6, the offset between the first planar region 46 and the rear second planar region 54 is shown in a schematic top view of the trailer 10. The forward first planar region 46 is substantially coplanar along a first plane 58. First plane 58 is also substantially coplanar with the frame 22 of trailer 10. Accordingly, when the fairing and fender combination 18 is mounted to the trailer 10, the skirt 20 is substantially vertically below and in alignment with a portion of the frame 22. The rear second planar region 54 lies along a second plane 60 which is offset from the first plane 58. The space or gap between the first plane 58 and the second plane 60 defines an offset distance 62. In every embodiment of the present disclosure, the offset distance 62 between the first plane 58 and the second plane 60 is greater than three inches. In one exemplary embodiment, the offset distance 62 between the first plane 58 and the second plane 60 is in a range from twenty inches to thirty inches. In another particular embodiment, the offset distance 62 between the first plane 58 and the second plane 60 is about twenty-five inches. Accordingly, it is the rearward and outward extension of the transition region 50 which establishes the location of the respective planes that determine the offset distance 62. Thus, if the transition region 50 is lengthened and extends out farther, the offset distance 62 will increase. Alternatively, if the transition region 50 is shortened and does not extend radially outward as far from the longitudinal axis 30, then the offset distance 62 will decrease.

With continued reference to FIG. 6, at least a portion of the transition region 50 may lie along a plane 51 that is angled relative to longitudinal axis 30 (depending on whether the outer surface is flat or arcuate along transition region 50). An angle 53 is formed between the plane 51 of the transition region 50 and the longitudinal axis 30. The angle 53 is greater than twelve degrees (12°). The angle 53 that is greater than 12° may prove critical for correctly fitting or coupling the fairing and fender combination 18 to arcuate tank 12. In one embodiment the angle 53 may be in a range from about 12° to about 35°. In another embodiment, the angle 53 may be in a range from about 20° to about 30°. In one particular embodiment, the angle 53 is about 25°. However, it is to be clearly understood that the dimensions of angle 53 are not intended to be limiting and other degree values may be provided depending on the nature of fabrication for trailer 10.

With continued reference to FIG. 6, the first planar region 46 has a longitudinally aligned first length 64. The second planar region 54 has a longitudinally aligned second length 66. In one exemplary embodiment, a ratio of the first length 64 to the second length 66 is in a range from 2:1 to 1:1. In one particular embodiment, the ratio of the first length 64 relative to the second length 66 is about 13:8. The 13:8 ratio of the first length 64 to the second length 66 may prove critical in some embodiments based on the size of the tank 12 and its arcuate cross sectional configuration supported by frame 22. However, it is to be clearly understood that these dimensions are not intended to be limiting and other sizes may be provided depending on the nature of fabrication for trailer 10.

Figure 3:
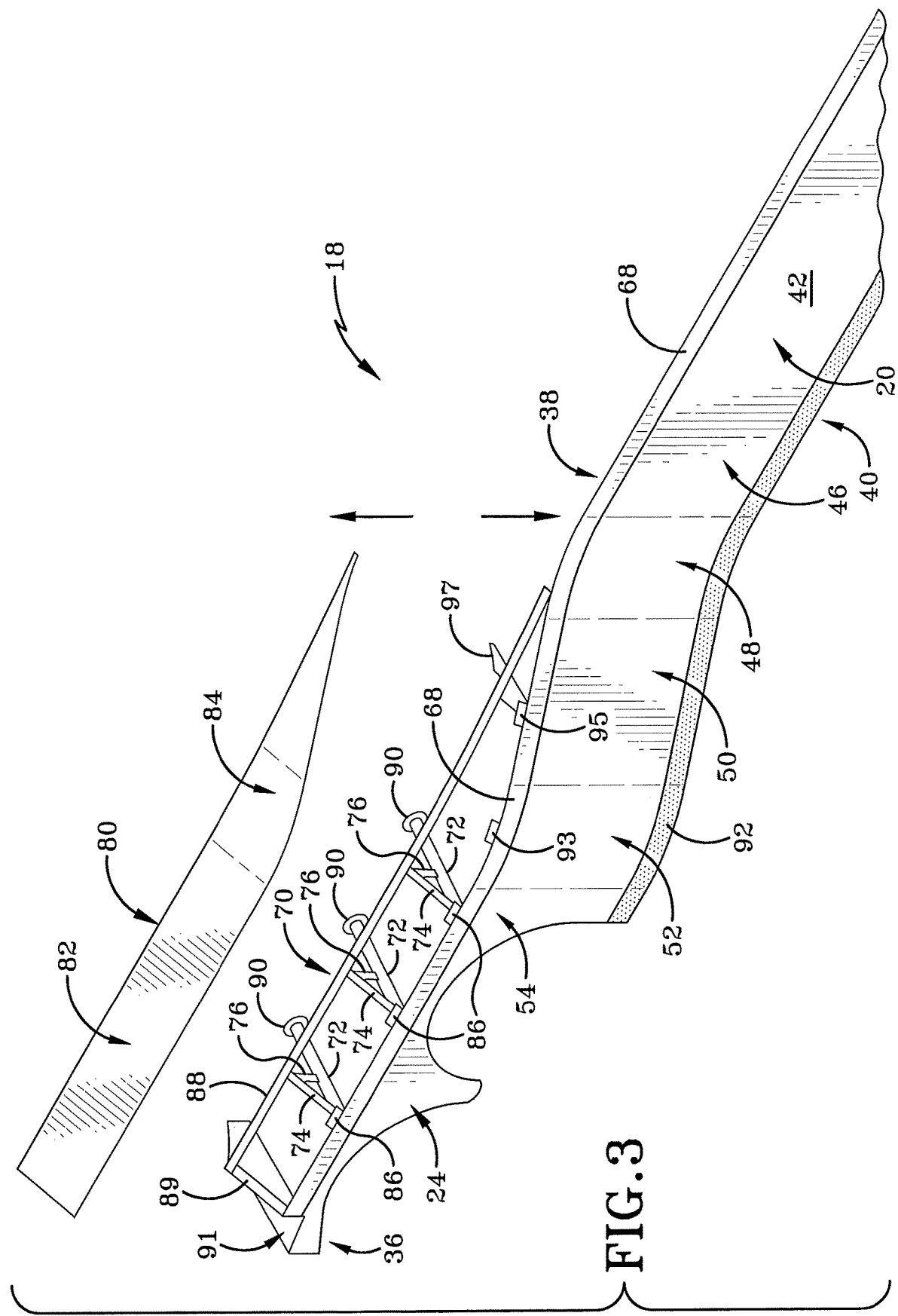
FIG. 3 is an outside perspective view of the aerodynamic fairing and fender combination device of FIG. 2 shown with the cover removed.

As depicted in FIG. 2 and FIG. 3, an elongated angle bracket 68 may be positioned adjacent the top edge 38 of the fairing and fender combination 18 extending longitudinally from the forward end 34 towards the rear end 36. Angle bracket 68 is utilized to couple the top edge 38 of the fairing and fender combination 18 to other components on the trailer 10. Accordingly, the angle bracket 68 includes a similar or complementary profile shape as the fairing and fender combination 18. Thus, the elongated angle bracket is longitudinally aligned above the forward first planar region 46, is bent above the first bend 48, is complementary to the shape of the transition region 50, is bent above the second bend 52, and is longitudinally aligned above the rear second planar region 54. Stated otherwise, as shown in FIG. 1, the angle bracket 68 couples the skirt 20 defined by the forward first planar region 46 near the middle of tank 12. Additionally, the angle bracket 68, near the rear end 36 of the fairing and fender combination 18, is rigidly connected with a rear subframe assembly 70.

Angle bracket 68 may be formed from a substantially rigid material such as aluminum. Angle bracket may be T-shaped in cross section. The traditional "top" of the T-shaped cross section may face outwardly, and the leg 69 of the T-shaped cross section may be oriented substantially horizontal in the transverse direction and parallel to ground. Leg 69 (FIG. 8) is sized to receive and connect with support brackets or support struts, as will be described in greater detail below.

A rear subframe assembly 70 includes at least one outrigger 72 and an angled flange 74. The outrigger 72 has a transversely aligned length defining an inner end rigidly coupled with frame 22 and an axial outer second end that is rigidly coupled with elongated angle bracket 68. The subframe assembly 70 and, more particularly, the outrigger 72, provide structural support to the rear regions of the fairing and fender combination 18 to support the same as it may be suspended in a cantilevered manner from away from frame 22 of trailer 10.

Figure 7:
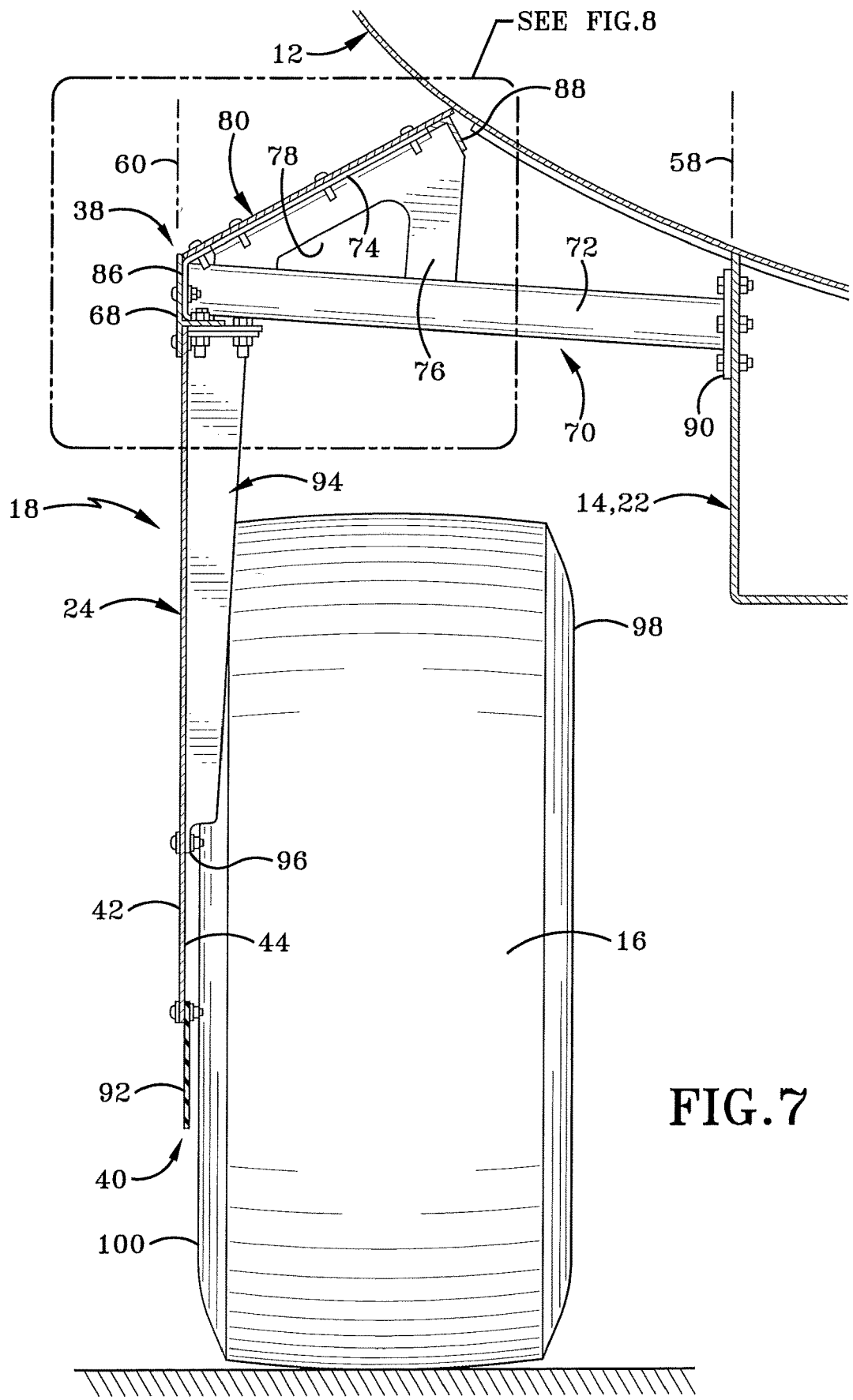
FIG. 7 is a cross section view of the aerodynamic fairing and fender combination device taken along line 7-7 in FIG. 1.
Figure 8:
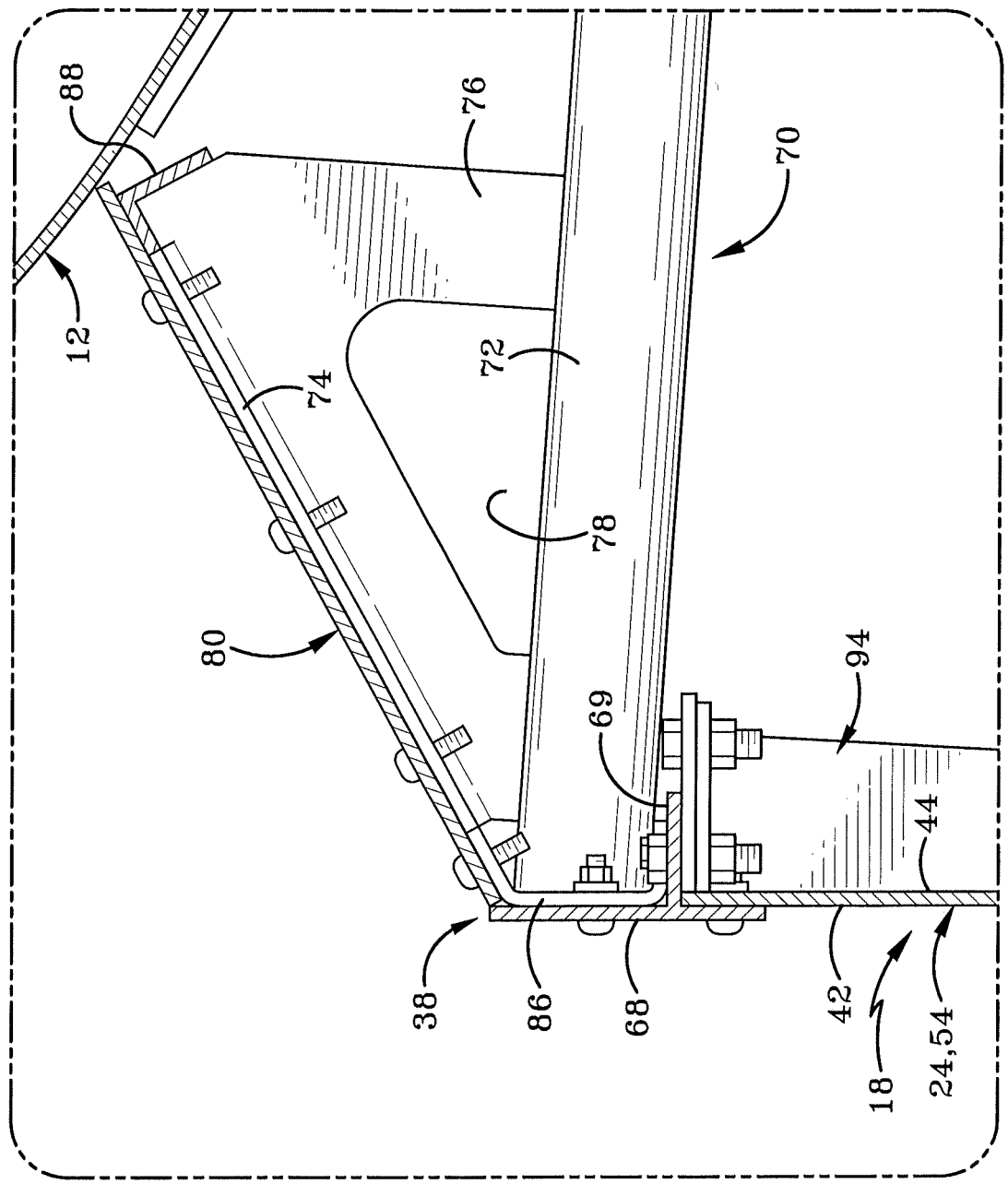
FIG. 8 is an enlarged cross section view of the region labeled "SEE FIG. 8" in FIG. 7.

As depicted in FIG. 7 and FIG. 8, subframe assembly 70 further includes an angle bracket 76 supporting support flange 74 thereon. The angle bracket 76 may define an aperture 78. Aperture 78 is located above the outrigger 72 to enable various wires or hoses to extend therethrough. The wires and hoses that may be sized to fit through aperture 78 can be used to control various components of trailer 10 such as brake lights, or the like, or they may be hoses configured to be in operative communication with pneumatic lines or other fluid lines that affect the operation of the flowable materials entering or exiting tank 12.

As depicted in FIG. 3, a cover 80 may be installed over the subframe assembly 70. The cover 80 is angled relative to horizontal in a similar manner as the angle bracket 76. Some embodiments of trailer 10 may provide cover 80 to be removable such that an operator has the option to mount cover 80 on the subframe assembly 70 or to leave the subframe assembly 70 exposed and not mounting the cover 80 thereon. The cover 80 has a rear region 82 with substantially parallel edges, but the forward region of the cover 80 aligns with the second bend 52 and the transition region 50 such that it curves and narrows to a point where the cover 80 would be installed above or near the first bend 48. The rear region 82 may be supported near the rear end 36 by a flange 89 on a rear plate 91. The forward region 84 of cover 80 may include a convex upwardly facing top surface near the second bend 52. As shown in FIG. 7 and FIG. 8, the cover 80 may be attached to the subframe assembly by mechanical fastening means such as screws or bolts however, other attachment means are entirely possible. Furthermore, while not intended to be limiting, a C-shaped bracket 86 may be positioned at the second axial outermost end of outrigger 72 to effectuate the mechanical connection of cover 80 to the subframe assembly 70.

Figure 4:
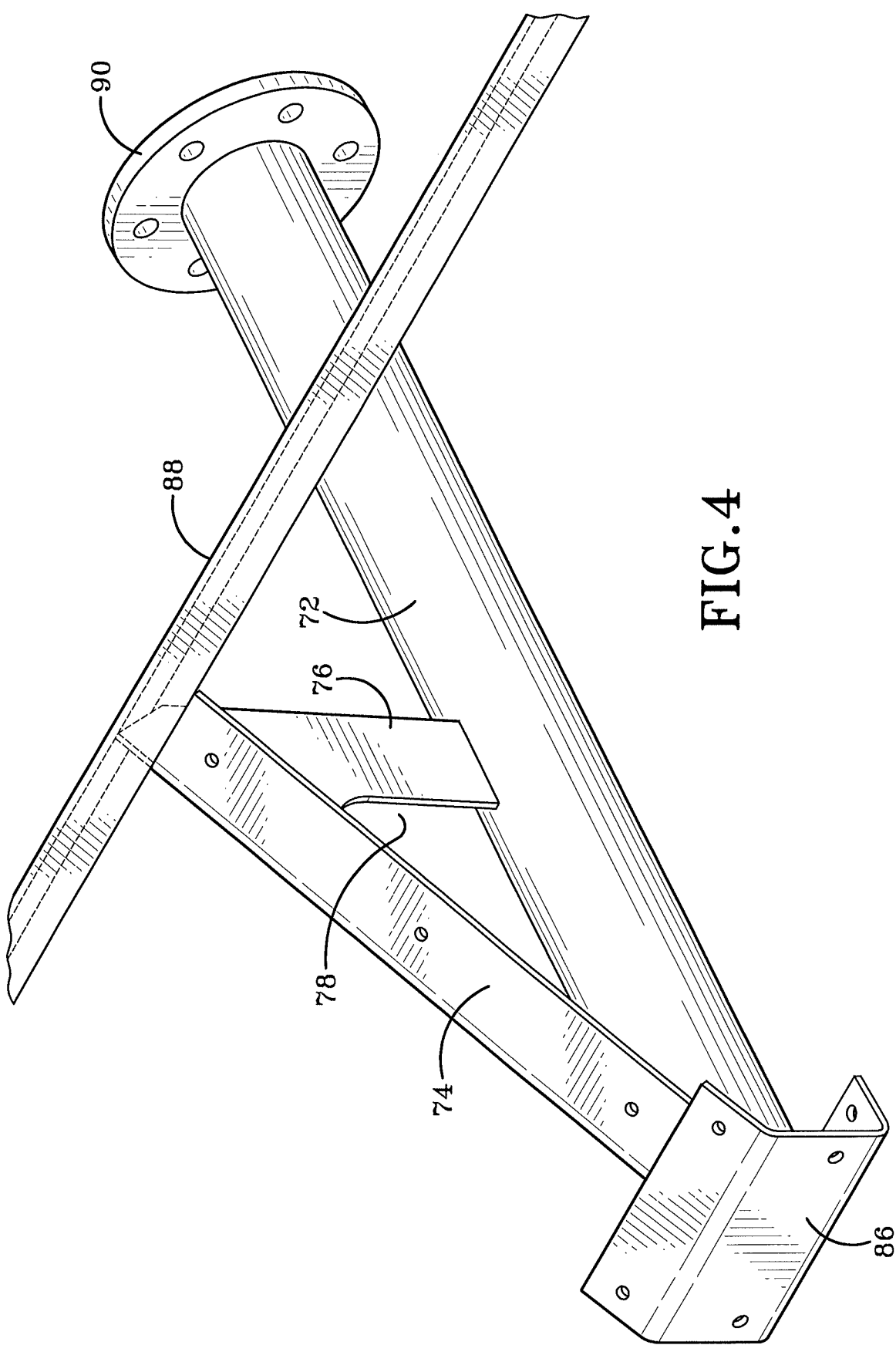
FIG. 4 is an isolated perspective view of a rear subframe assembly that supports a portion of the aerodynamic fairing and fender combination device.

As depicted in FIG. 4, subframe assembly 70 further includes a longitudinally aligned angle bracket 88 to assist with the connection of the cover 80 to the rear portion of tank 12. While not intended to be limiting, an annular flange 90 may be rigidly connected to the first end of outrigger 72 to couple outrigger 72 with frame 22 of trailer 10.

With continued reference to FIG. 4, a bracket 93 may be shaped similar to C-shaped bracket 86, however is not connected to an outrigger. Bracket 93 may connect with elongated angle bracket 68 and extend thereabove to provide a slight upward surface for the forward region 84 to mount thereon. A bracket 95 may be shaped similar to bracket 86 and bracket 93 but is connected with an arcuate brace 97. Bracket 95 and rigidly connected brace 97 are positioned forwardly from all the outriggers 72. Brace 97 is rigidly connected with the tank 12. Accordingly, the brace 97 includes an arcuate edge that is curved complementary to the curvature of the tank 12.

Figure 5:
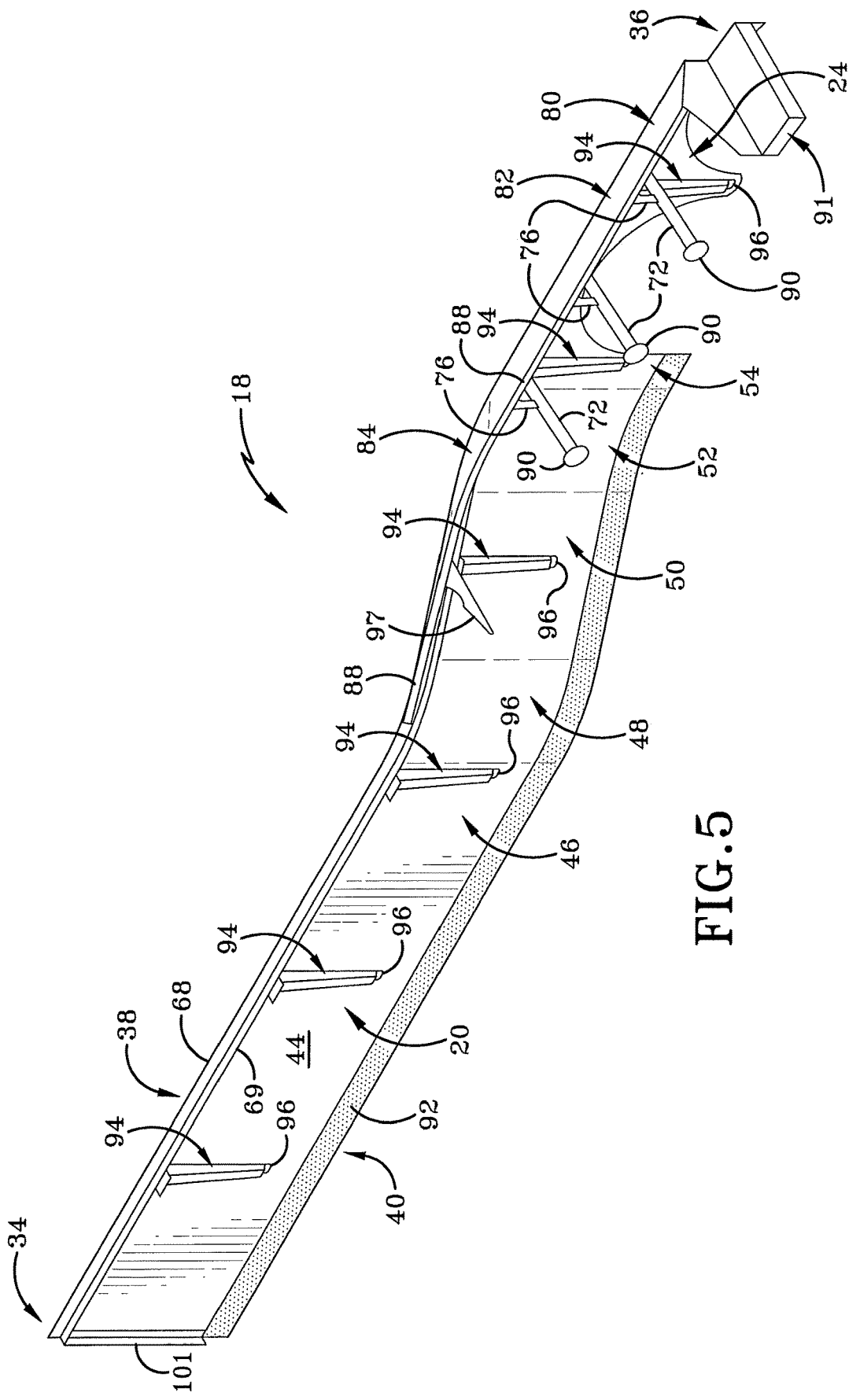
FIG. 5 is an inside perspective view of the aerodynamic fairing and fender combination device.

As depicted in FIG. 5, the air fairing and fender combination 18 hangs downwardly towards the bottom edge 40 which may be covered by a small protective flap or cover 92 that extends longitudinally along the length of the bottom edge. A forward support 101 is coupled with the leading edge of the skirt 20. The inner surface 44 of the suspended air fairing and fender combination 18 may be supported by brackets or support struts 94 positioned to extend downwardly from adjacent the top edge 38. The support struts 94 extend downwardly to a bottom end 96. The bottom end 96 of support struts 94 is positioned above the bottom edge 40 of the air fairing and fender combination 18. Furthermore, the bottom end 96 of support strut 94 is positioned above the cover 92. Stated otherwise, the bottom or lower end 96 of the support strut 94 is not level with the bottom edge 40 of the air fairing and fender combination 18. The position of the lower end 96 above the bottom edge 40 enables the flexible material forming the air fairing and fender combination 18 to flex inwardly towards longitudinal axis 30 of trailer 10 when subjected to external forces. This may be beneficial in the event that the trailer accidently hits an object and needs to flex inward in order to reduce the likelihood of damage.

As depicted in FIG. 7, the first plane 58 is located axially inward towards the longitudinal center axis 30 from an inner edge 98 of ground engaging wheels 16. Accordingly, the offset distance between first plane 58 and the second plane 60 is greater than the width of the ground engaging wheels 16. For example, if the transversely aligned width of ground engaging wheels 16 is about sixteen inches and the offset distance 62 between the first plane 58 and the second plane 60 is greater than the transversely aligned width of ground engaging wheels 16. Furthermore, second plane 60 is positioned closely adjacent but slightly axially outward of the outer edge 100 of ground engaging wheels 16.

In accordance with one aspect of the present disclosure, the air fairing and fender combination 18 provides an aerodynamic device that should increase aerodynamic efficiency for tank trailer 10. The fabrication of the air fairing and fender combination 18 from a single uniform material such as a rubber or other flexible materials enables the air fairing and fender combination 18 to be lightweight so as to not add much weight which increases fuel economy for the trailer 10. When the air fairing and fender combination 18 is installed on the trailer, the leading forward edge 34 is positioned closely adjacent but proximately rearward from landing gear 102. Landing gear 102 may further be incorporated with channels or grooves so as to hold a forward wind deflector 104. Forward wind deflector 104 is shown in dot-dash lines in FIG. 1 to identify that its shape may be varied depending on the intended design of the manufacturer. For example, the wind deflector 104 connected with landing gear 102 may be substantially arcuate as depicted in FIG. 6 to define an apex 106. The apex 106 is positioned along the longitudinal axis 30. The wind deflector 104 enables air to move around each of the respective left and right air fairing assemblies of the present disclosure. Recall the air fairing assemblies are on each left and right side of the trailer 10 respectively and have not been described twice for brevity. However, it is to be understood that air could move to the left or could move to the right of apex 106 to move along the respective planar surfaces of the left air fairing and fender combination 18 and the right air fairing and fender combination 18.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed:

1. An aerodynamic fairing and fender combination for a tank trailer that is at least partially arcuate in cross section configured to contain a flowable material therein, the combination comprising:
   a forward end and a rear end defining a longitudinal direction therebetween;
   a top edge and a bottom edge defining a vertical direction therebetween;
   an outer surface opposite an inner surface defining a transverse direction therebetween wherein the inner surface faces towards a central longitudinal axis of the trailer and the outer surface faces outwardly away from the central longitudinal axis of the trailer;
   a first planar region proximate the forward end and extending rearwardly therefrom;
   a transition region connected to the first planar region at an arcuately concave first bend, wherein the transition region extends rearwardly from the first bend and outwardly from the central longitudinal axis of the trailer;
   a second planar region connected to the transition region at an arcuately convex second bend rearward from the first bend and the second planar region extending rearwardly from the second bend towards the rear end, wherein the second planar region is offset from the first planar region by an offset distance greater than 3 inches;
   wherein the first planar region defines an aerodynamic skirt beneath the trailer and the second planar region defines a fender for wheels of the trailer such there is a smooth transition at the transition region from the skirt beneath the trailer to the fender covering the wheels;
      wherein the skirt and fender are collectively defined by the first planar region, the transition region, and the second planar region are integrally formed from a flexible material so as to permit the bottom edge to bend inwardly towards the central longitudinal axis when subjected to an external force.

2. The aerodynamic fairing and fender combination of claim 1, further comprising:
   a first longitudinal plane coplanar with the first planar region;
   a second longitudinal plane coplanar with the second planar region;
   an offset distance of the first longitudinal plane from the second longitudinal plane in a range from 20 inches to 30 inches.

3. The aerodynamic fairing and fender combination of claim 1, wherein the offset distance is about 25 inches.

4. The aerodynamic fairing and fender combination of claim 1, wherein the skirt and fender that are collectively defined by the first planar region, the transition region, and the second planar region are integrally formed from a single seamless uniform material.

5. The aerodynamic fairing and fender combination of claim 1, wherein the outer surface of the skirt and fender collectively defined by the first planar region, the transition region, and the second planar region is continuous.

6. The aerodynamic fairing and fender combination of claim 1, further comprising:
   a first support strut positioned closely adjacent the inner surface of the skirt in the first planar region, the first support strut having an upper end and a lower end;
   wherein the lower end of the support strut is positioned above the bottom edge.

7. The aerodynamic fairing and fender combination of claim 6, further comprising:
   a second support strut positioned closely adjacent the inner surface of the fender in the second planar region, the second support strut having an upper end and a lower end;
   a generally transversely oriented outrigger having a transversely aligned length in a range from 20 inches to 30 inches;
   the outrigger having an inner end connected to a frame of the trailer and an outer end coupled to the second support strut.

8. The aerodynamic fairing and fender combination of claim 1, further comprising:
   a longitudinally aligned first length of the first planar region;
   a longitudinally aligned second length of the second planar region;
   a ratio of the first length to the second length in range from 2:1 to 1:1.

9. The aerodynamic fairing and fender combination of claim 8, wherein the ratio of the first length to the second length is about 13:8.

10. The aerodynamic fairing and fender combination of claim 1, further comprising:
an inner edge of one tire;
wherein the first planar region is positioned inwardly from the inner edge relative to the central longitudinal axis of the trailer; and
wherein the second planar region is positioned outwardly from the inner edge relative to the central longitudinal axis of the trailer.

11. A tank trailer towable by a truck comprising:
a tank having an at least partially arcuate cross section to contain flowable material therein;
at least one discharge outlet in operable communication with the tank to permit the flowable material to exit the tank therethrough;
a trolley having ground engaging wheels operatively connected to a trailer frame adjacent a rear end of the tank; and
an air fairing and fender combination coupled to the trailer frame, wherein the air fairing and fender combination includes a skirt positioned beneath the tank that smoothly transitions outwardly to form a fender proximate the ground engaging wheels, wherein the air fairing and fender combination define an elongated generally S-shaped profile having a concave bend and a convex bend, and wherein the skirt and fender are integrally formed from a flexible material so as to permit the bottom edge to bend inwardly towards a longitudinal axis when subjected to an external force.

12. The tank trailer of claim 11, further comprising landing gear on the tank trailer positioned forwardly from the skirt and a convex wind deflector extending forwardly from a connection with the landing gear.

\* \* \* \* \*